(12) United States Patent
Cheng

(10) Patent No.: US 11,966,525 B2
(45) Date of Patent: Apr. 23, 2024

(54) TOUCH DEVICE WITH FPR FUNCTION AND OPERATION METHOD THEREOF

(71) Applicant: NOVATEK Microelectronics Corp., Hsinchu (TW)

(72) Inventor: Huan-Teng Cheng, Hsinchu (TW)

(73) Assignee: NOVATEK Microelectronics Corp., Hsinchu (TW)

(*) Notice: Subject to any disclaimer, the term of this patent is extended or adjusted under 35 U.S.C. 154(b) by 7 days.

(21) Appl. No.: 17/457,669

(22) Filed: Dec. 6, 2021

(65) Prior Publication Data

US 2022/0327311 A1 Oct. 13, 2022

Related U.S. Application Data

(60) Provisional application No. 63/172,076, filed on Apr. 7, 2021.

(51) Int. Cl.
*G06F 3/041* (2006.01)
*G06F 3/044* (2006.01)
*G06F 21/32* (2013.01)

(52) U.S. Cl.
CPC ............ *G06F 3/0412* (2013.01); *G06F 3/044* (2013.01); *G06F 21/32* (2013.01); *G06F 2218/00* (2023.01)

(58) Field of Classification Search
CPC .............. G06F 3/041–047; G06V 40/12–1394
See application file for complete search history.

(56) References Cited

U.S. PATENT DOCUMENTS

| | | | |
|---|---|---|---|
| 2003/0090650 A1 | 5/2003 | Fujieda | |
| 2005/0083768 A1* | 4/2005 | Hara | G11C 11/22 365/232 |
| 2016/0055364 A1 | 2/2016 | Lee et al. | |
| 2016/0202828 A1* | 7/2016 | Tsai | G06F 3/044 345/173 |
| 2019/0064948 A1 | 2/2019 | Mizuhashi et al. | |
| 2020/0241722 A1* | 7/2020 | Kim | G06F 3/041661 |
| 2020/0242325 A1* | 7/2020 | Hashimoto | G06V 40/13 |
| 2021/0065610 A1* | 3/2021 | Xu | G09G 3/3266 |
| 2022/0093032 A1* | 3/2022 | Lin | G06V 40/1318 |
| 2022/0317852 A1* | 10/2022 | Park | G06V 40/1306 |

FOREIGN PATENT DOCUMENTS

| | | |
|---|---|---|
| CN | 107037913 B | 1/2020 |
| CN | 111781760 A | 10/2020 |

* cited by examiner

*Primary Examiner* — Roberto W Flores
(74) *Attorney, Agent, or Firm* — CKC & Partners Co., LLC

(57) ABSTRACT

A touch device with the FPR function includes a plurality of sensing regions, a plurality of first switch sets, a plurality of first shift register circuits, a plurality of second switch sets, and a plurality of second shift register circuits. The first switch sets are coupled to transmitting electrodes and to transmit a first signal. The first shift register circuits are to control the first switch sets according to a plurality of first reset signals and a plurality of first control signals respectively. The second switch sets are coupled to receiving electrodes and to receive a second signal. The second shift register circuits are to control the second switch sets according to a second reset signal and a plurality of second control signals. The first signal and the second signal are for a touch operation and a FPR operation.

12 Claims, 19 Drawing Sheets

TOUCH DEVICE WITH FPR FUNCTION AND OPERATION METHOD THEREOF

RELATED APPLICATIONS

This application claims priority to U.S. Provisional Application Ser. No. 63/172,076, filed Apr. 7, 2021, which is herein incorporated by reference.

BACKGROUND

Technical Field

The present disclosure relates to touch technology and fingerprint recognition (FPR) technology. More particularly, the present disclosure relates to a touch device with the FPR function and operation method thereof.

Description of Related Art

With developments of technology, electrical devices supporting the touch function and the FPR function are applied in some applications. In other words, these electrical devices are designed to be able to determine touch position of users and be able to recognize fingerprints of users.

SUMMARY

Some aspects of the present disclosure are to provide a touch device with a FPR function. The touch device with the FPR function includes a plurality of sensing regions, a plurality of first switch sets, a plurality of first shift register circuits, a plurality of second switch sets, and a plurality of second shift register circuits. The sensing regions include transmitting electrodes and receiving electrodes. The first switch sets are coupled to the transmitting electrodes and to transmit a first signal. The first shift register circuits are to control the first switch sets according to a plurality of first reset signals and a plurality of first control signals respectively. The second switch sets are coupled to the receiving electrodes and to receive a second signal. The second shift register circuits are to control the second switch sets according to a second reset signal and a plurality of second control signals. The first signal and the second signal are for a touch operation and a FPR operation.

Some aspects of the present disclosure are to provide an operation method of a touch device with the FPR function. The operation method includes following operations: controlling, by a plurality of first shift register circuits, a plurality of first switch sets according to a plurality of first reset signals and a plurality of first control signals respectively, in which the first switch sets are coupled to a plurality of transmitting electrodes to transmit a first signal; and controlling, by a plurality of second shift register circuits, a plurality of second switch sets according to a second reset signal and a plurality of second control signals, in which the second switch sets are coupled to a plurality of receiving electrodes to receive a second signal. The first signal and the second signal are for a touch operation and a FPR operation.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
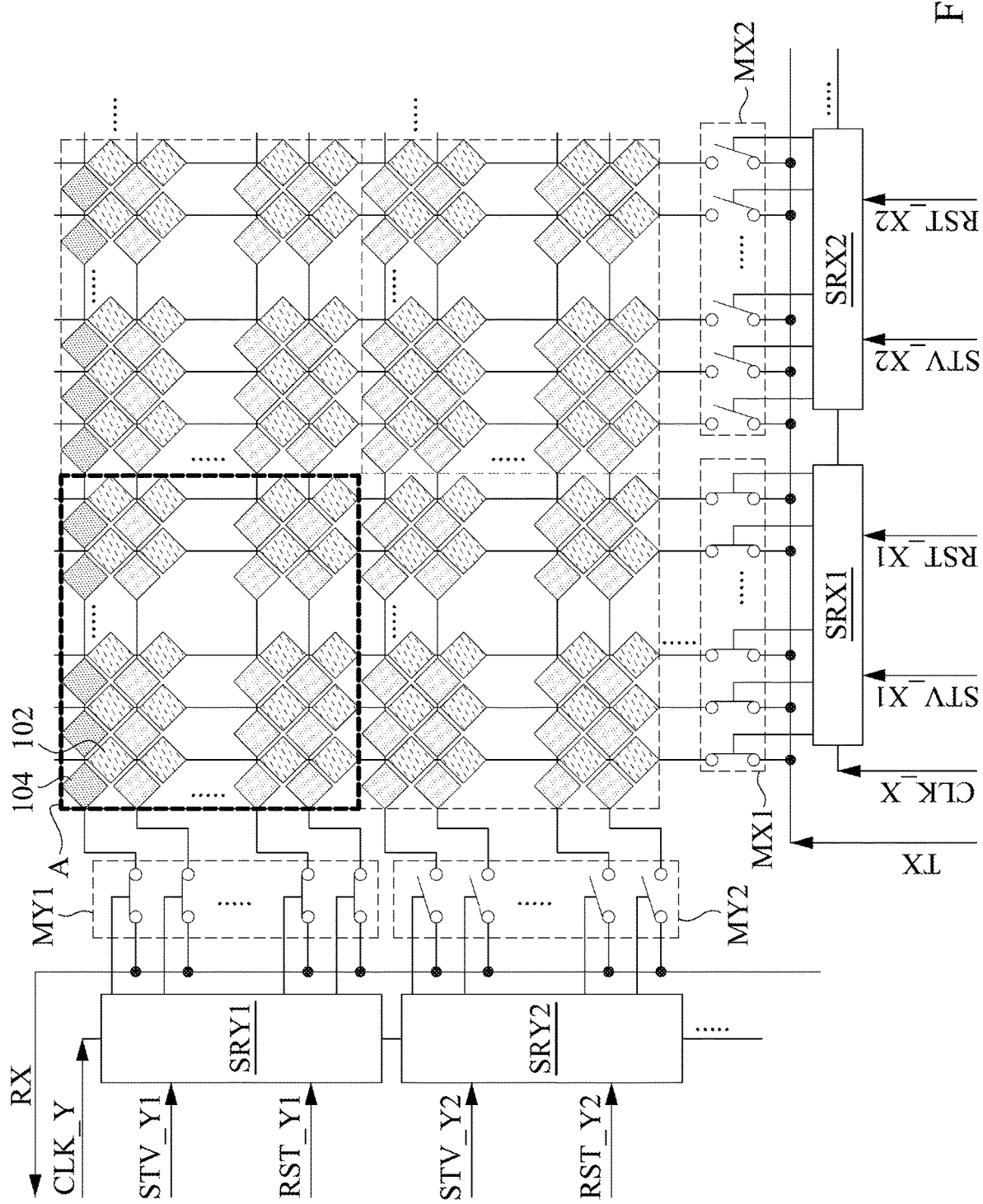
FIG. 1 is a schematic diagram illustrating a touch device with a FPR function performing a touch operation according to some embodiments of the present disclosure.

Reference is made to FIG. 1. FIG. 1 is a schematic diagram illustrating a touch device with a FPR function 100 performing a touch operation according to some embodiments of the present disclosure. The device in FIG. 1 not only can perform a touch function but also can perform a FPR function.

In some embodiments, the touch device with the FPR function 100 can be integrated with a display device to form a fingerprint, touch, and display integration (FTDI) device. For example, the touch device with the FPR function 100 can be disposed in smart cell phones or other electrical devices. The display device can be an OLED display device or other display devices.

As illustrated in FIG. 1, the touch device with the FPR function 100 includes sensing regions A, switch sets MX1-MX2, shift register circuits SRX1-SRX2, switch sets MY1-MY2, and shift register circuits SRY1-SRY2. Each of the shift register circuits SRX1-SRX2 and SRY1-SRY2 includes a plurality of shift registers.

Each of the sensing regions A includes transmitting electrodes 102 and receiving electrodes 104. A capacitor is formed between one of the transmitting electrodes 102 and a corresponding receiving electrode 104. The transmitting electrodes 102 and the receiving electrodes 104 can be utilized to perform the touch function and the FPR function. In other words, the touch function and the FPR function share the transmitting electrodes 102 and receiving electrodes 104. This method can be utilized to implement a full screen FPR sensing mechanism.

The switch sets MX1-MX2 are coupled to the transmitting electrodes 102. For example, each switch of the switch sets MX1-MX2 is coupled to one column of the transmitting electrodes 102. The shift register circuits SRX1-SRX2 are coupled to the switch sets MX1-MX2 respectively. The switches of the switch sets MX1-MX2 receive a transmitting signal TX and transmit the transmitting signal TX to the transmitting electrodes 102. The shift register circuits SRX1-SRX2 control the switches of the switch sets MX1-MX2 according to a clock signal CLK_X, reset signals RST_X1 and RST_X2, and control signals STV_X1-STV_X2 respectively.

The switch sets MY1-MY2 are coupled to the receiving electrodes 104. For example, each switch of the switch sets MY1-MY2 is coupled to one row of the receiving electrodes 104. The shift register circuits SRY1-SRY2 are coupled to the switch sets MY1-MY2 respectively. The switches of the switch sets MY1-MY2 receive a receiving signal RX from the receiving electrodes 104. The shift register circuits SRY1-SRY2 control the switches of the switch sets MY1-MY2 according to a clock signal CLK_Y, reset signals RST_Y1 and RST_Y2, and control signals STV_Y1-STV_Y2 respectively.

With the arrangements, the structure of the touch device with the FPR function 100 forms a mutual-capacitance type.

It is noted that the quantities of the sensing regions A, the switch sets MX1-MX2, the shift register circuits SRX1-SRX2, the switch sets MY1-MY2, and the shift register circuits SRY1-SRY2 in FIG. 1 are for illustration, and the present disclosure is not limited thereto. For example, the touch device with the FPR function 100 can includes 32 switch sets to receive the transmitting signal TX and 36 switch sets to receive the receiving signal RX. In this example, there are 36×32 channels in an array.

Figure 2:
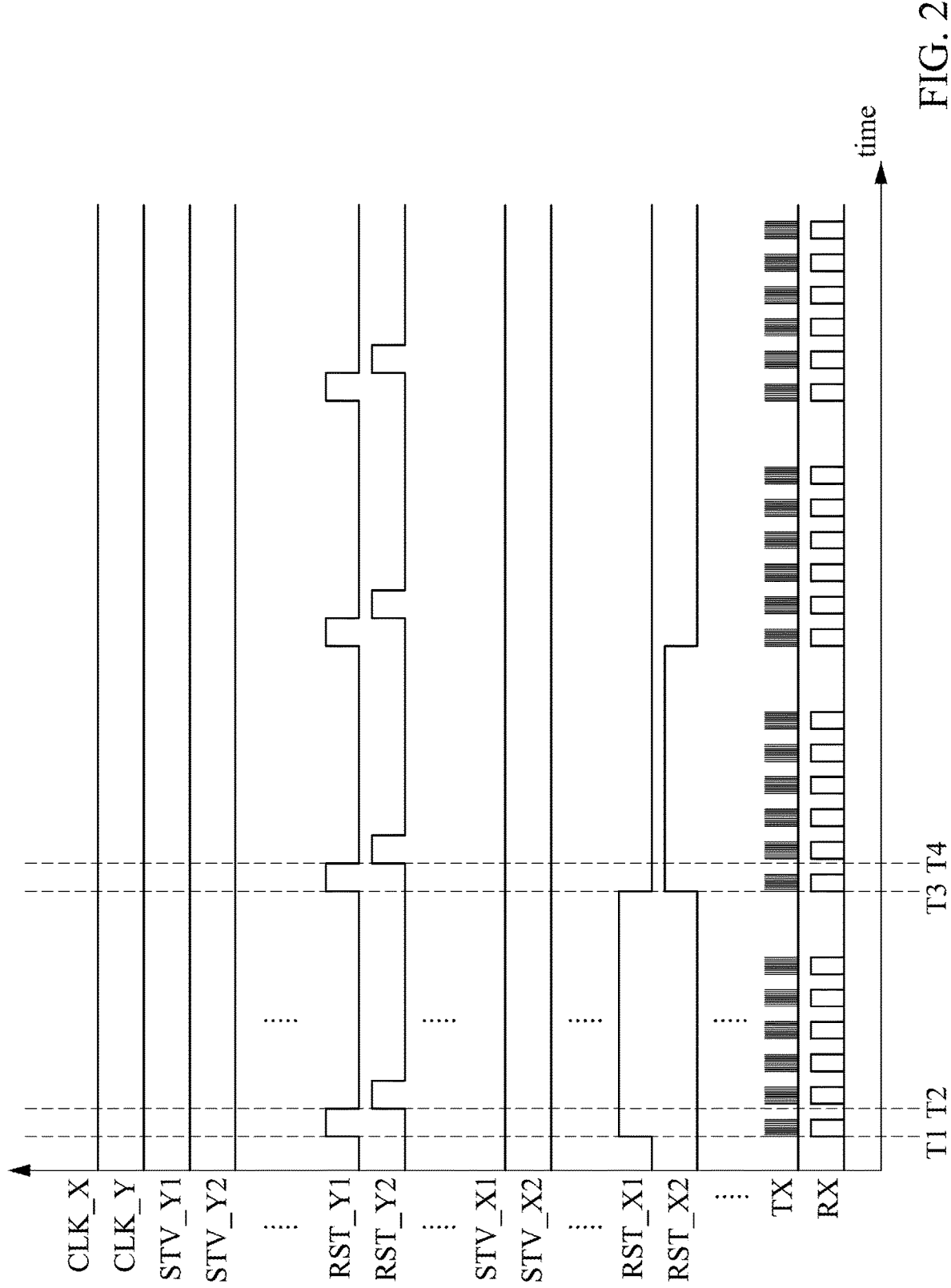
FIG. 2 is a timing sequence diagram illustrating signals in FIG. 1 according to some embodiments of the present disclosure.

References are made to FIG. 1 and FIG. 2. FIG. 2 is a timing sequence diagram illustrating the signals in FIG. 1 according to some embodiments of the present disclosure.

During a touch operation, the transmitting signal TX is a touch transmitting signal, and the receiving signal RX is a touch receiving signal.

As illustrated in FIG. 2, at a timing point T1, the reset signal RST_X1 is changed from a disable level to an enable level. Accordingly, the shift register circuit SRX1 turns on the switches of the switch set MX1 according to the reset signal RST_X1. In this situation, the capacitors of the sensing regions A in the first column are connected in parallel. The turned-on switches of the switch set MX1 transmit the touch transmitting signal TX to the transmitting electrodes 102 of the sensing regions A in the first column. In addition, the reset signals RST_Y1 is changed from a disable level to an enable level. Accordingly, the shift register circuit SRY1 turns on the switches of the switch set MY1 according to the reset signal RST_Y1. In this situation, the capacitors of the sensing regions A in the first row are connected in parallel. The turned-on switches of the switch set MY1 receive the touch receiving signal RX from the receiving electrodes 104 of the sensing regions A in the first row and then transmit the touch receiving signal RX to a processor circuit (not shown).

At a timing point T2, the reset signal RST X1 still has the enable level, and the reset signals RST_Y2 is changed from a disable level to an enable level. Accordingly, the shift register circuit SRY2 turns on the switches of the switch set MY2 according to the reset signal RST_Y2. In this situation, the capacitors of the sensing regions A in the second row are connected in parallel. The turned-on switches of the switch set MY2 receive the touch receiving signal RX from the receiving electrodes 104 of the sensing regions A in the second row and then transmit the touch receiving signal RX to the processor circuit.

At a timing point T3, the reset signal RST_X2 is changed from a disable level to an enable level. Accordingly, the shift register circuit SRX2 turns on the switches of the switch set MX2 according to the reset signal RST_X2. In this situation, the capacitors of the sensing regions A in the second column are connected in parallel. The turned-on switches of the switch set MX2 transmit the touch transmitting signal TX to the transmitting electrodes 102 of the sensing regions A in the second column. In addition, the reset signal RST_Y1 changing from the disable level to the enable level. The shift register circuit SRY1 turns on the switches of the switch set MY1 according to the reset signal RST_Y1. In this situation, the capacitors of the sensing regions A in the first row are connected in parallel. The turned-on switches of the switch set MY1 receive the touch receiving signal RX from the receiving electrodes 104 of the sensing regions A in the first row and then transmit the touch receiving signal RX to the processor circuit.

At a timing point T4, the reset signal RST_X2 still has the enable level, and the reset signals RST_Y2 is changed from the disable level to the enable level. Accordingly, the shift register circuit SRY2 turns on the switches of the switch set MY2 according to the reset signal RST_Y2. In this situation, the capacitors of the sensing regions A in the second row are connected in parallel. The turned-on switches of the switch set MY2 receive the touch receiving signal RX from the receiving electrodes 104 of the sensing regions A in the second row and then transmit the touch receiving signal RX to the processor circuit.

Based on the similar operations, the processor circuit receives the touch receiving signal RX of each sensing regions. A voltage of the touch receiving signal RX can reflect a capacitive value. For example, if a touch event occurs at a position corresponding to a transmitting electrode 102 and a receiving electrode 104, the capacitive value between the transmitting electrode 102 and the receiving electrode 104 changes. Accordingly, the processor circuit can determine the touch position according to the corresponding touch receiving signals RX.

It is noted that the touch operation is mainly controlled by the reset signals RST_X1-RST_X2 and RST_Y1-RST_Y2, and the clock signals CLK_X and CLK_Y have disable levels.

Figure 3:
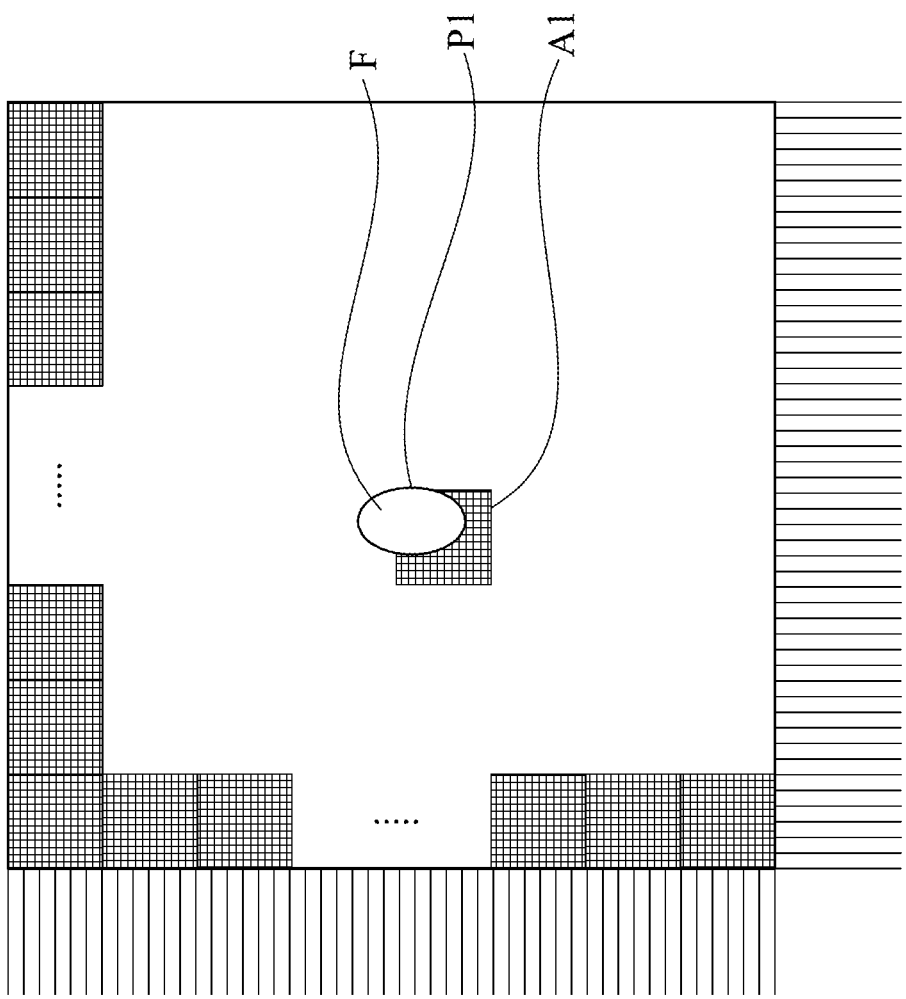
FIG. 3 is a schematic diagram illustrating the touch device with the FPR function in FIG. 1 from a touch operation to a FPR operation according to some embodiments of the present disclosure.

Reference is made to FIG. 3. FIG. 3 is a schematic diagram illustrating the touch device with the FPR function 100 from a touch operation to a FPR operation according to some embodiments of the present disclosure.

As illustrated in FIG. 3, if a finger F touches a position P1 on the touch device with the FPR function 100, a sensing region A1 corresponding to the position P1 is determined for the subsequent FPR function.

Figure 4:
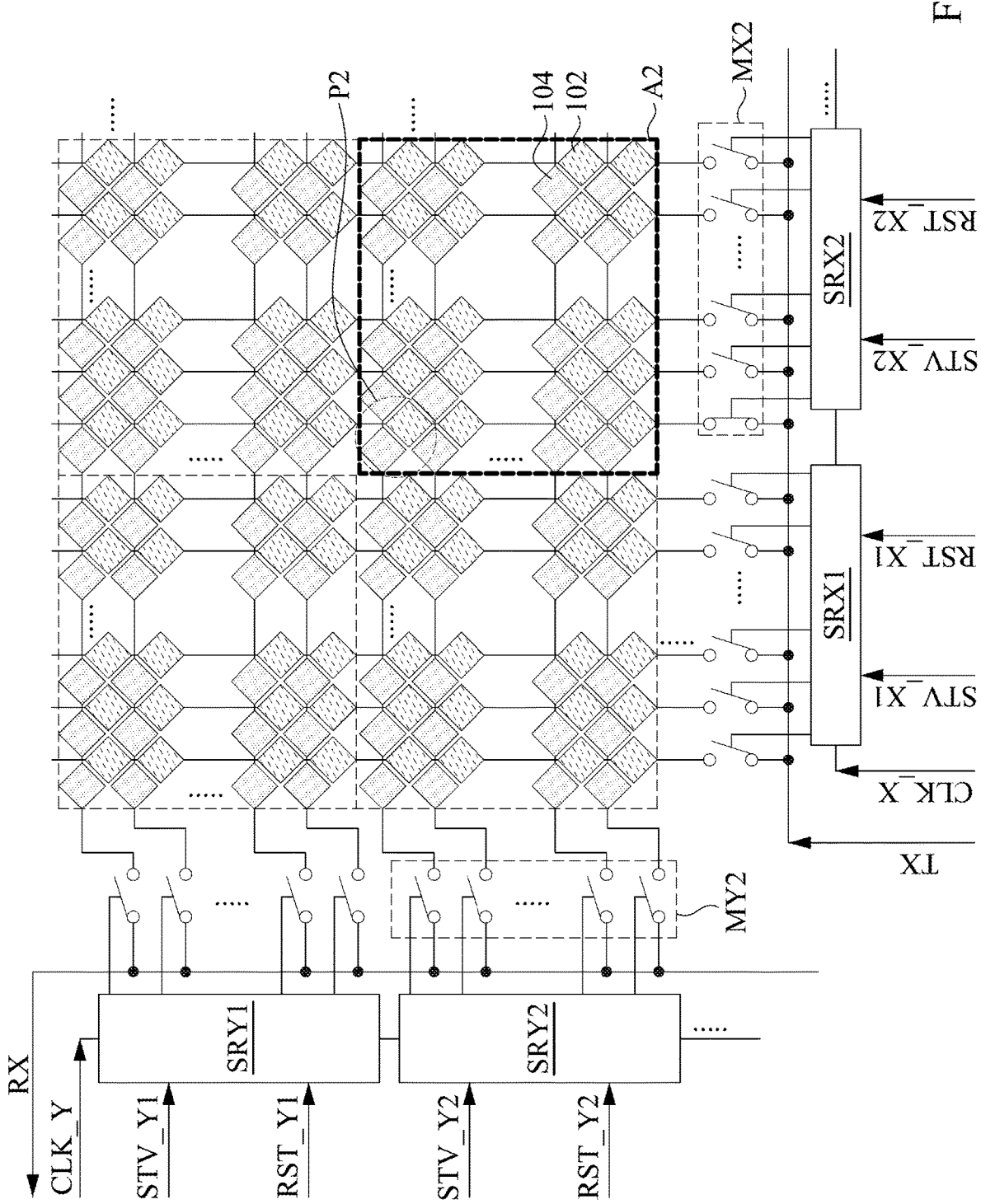
FIG. 4 is a schematic diagram illustrating the touch device with the FPR function in FIG. 1 performing the FPR operation according to some embodiments of the present disclosure.
Figure 5:
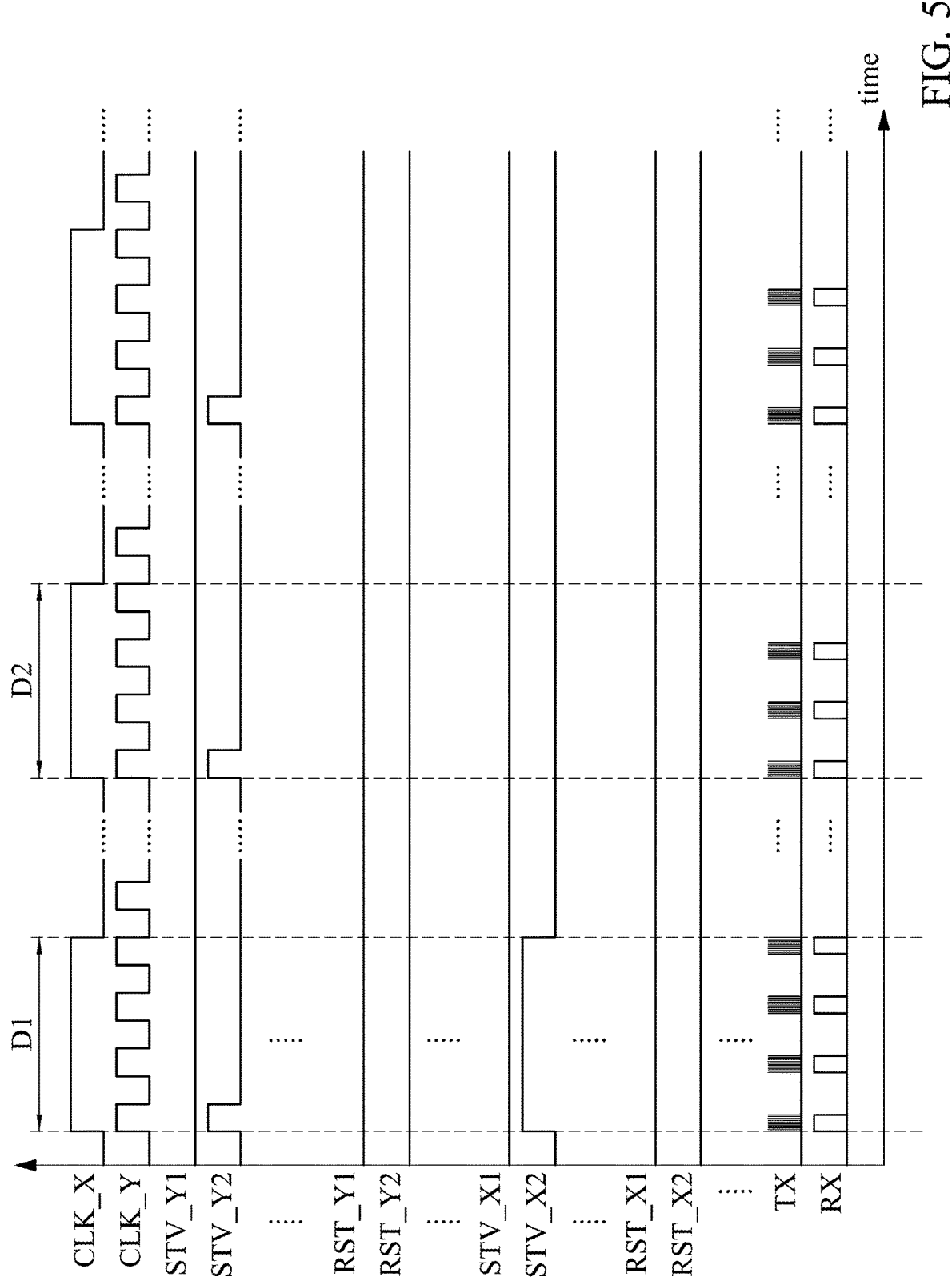
FIG. 5 is a timing sequence diagram illustrating signals in FIG. 4 according to some embodiments of the present disclosure.

References are made to FIG. 4 and FIG. 5. FIG. 4 is a schematic diagram illustrating the touch device with the FPR function 100 in FIG. 1 performing the FPR operation according to some embodiments of the present disclosure. FIG. 5 is a timing sequence diagram illustrating signals in FIG. 4 according to some embodiments of the present disclosure.

As described above, if a finger touches a position P2 on the touch device with the FPR function 100, a sensing region A2 corresponding to the position P2 is determined for the subsequent FPR operation. Since a coordination of the sensing region A2 is at the second column and at the second row, the shift register circuit SRX2 and the shift register circuit SRY2 are selected according to the coordination of the sensing region A2.

During the FPR operation, the transmitting signal TX is a FPR transmitting signal, and the receiving signal RX is a FPR receiving signal.

As illustrated in FIG. 5, during a time interval D1, the control signal STV_X2 has an enable level and the clock signal CLK_X has an enable level. Accordingly, the selected shift register circuit SRX2 is started up according to the control signal STV_X2 and turns on a first switch of the switch set MX2 according to the clock signal CLK_X. The turned-on first switch of the switch set MX2 transmits the FPR transmitting signal TX to corresponding transmitting electrodes 102. In addition, during the time interval D1, the control signal STV_Y2 has a pulse and the clock signal CLK_Y has multiple pulses. Accordingly, the selected shift register circuit SRY2 is started up according to the control signal STV_Y2 and turns on the switches of the switch set MY2 sequentially according to the clock signal CLK_Y. The turned-on switches of the switch set MY2 receive the FPR receiving signals RX from corresponding receiving electrodes 104 sequentially, and then transmit the FPR receiving signals RX to the processor circuit.

During a time interval D2, the clock signal CLK_X has the enable level. Accordingly, the selected shift register circuit SRX2 turns on a second switch of the switch set MX2 according to the clock signal CLK_X. The turned-on second switch of the switch set MX2 transmits the FPR transmitting signal TX to corresponding transmitting electrodes 102. In addition, during the time interval D2, the clock signal CLK_Y has multiple pulses. Accordingly, the selected shift register circuit SRY2 turns on the switches of the switch set MY2 sequentially according to the clock signal CLK_Y. The turned-on switches of the switch set MY2 receive the FPR receiving signals RX from corresponding receiving electrodes 104 sequentially, and then transmit the FPR receiving signals RX to the processor circuit.

Based on the similar operations, the transmitting electrodes 102 and the receiving electrodes 104 of the sensing region A2 are sensed, and the processor circuit receives the FPR receiving signals RX of the sensing region A2. A voltage of one FPR receiving signal RX can reflect a capacitive value. The voltages of the FPR receiving signals RX can be converted into digital signals by an analog-to-digital converter. The digital signals can indicate wave crests and wave troughs of the fingerprint of the finger F. Accordingly, the processor circuit can perform the FPR operation according to the digital signals.

With this configuration, each of shift register circuit SRX1-SRX2 and SRY1-SRY2 is connected to the sensing regions A of one column or one row. Thus, each of shift register circuit SRX1-SRX2 and SRY1-SRY2 is controlled by fewer signals, and a pin number can be reduced.

It is noted that the FPR operation is mainly controlled by the clock signals CLK_X and CLK_Y, and the reset signals RST_X1-RST_X2 and RST_Y1-RST_Y2 have disable levels.

Figure 6:
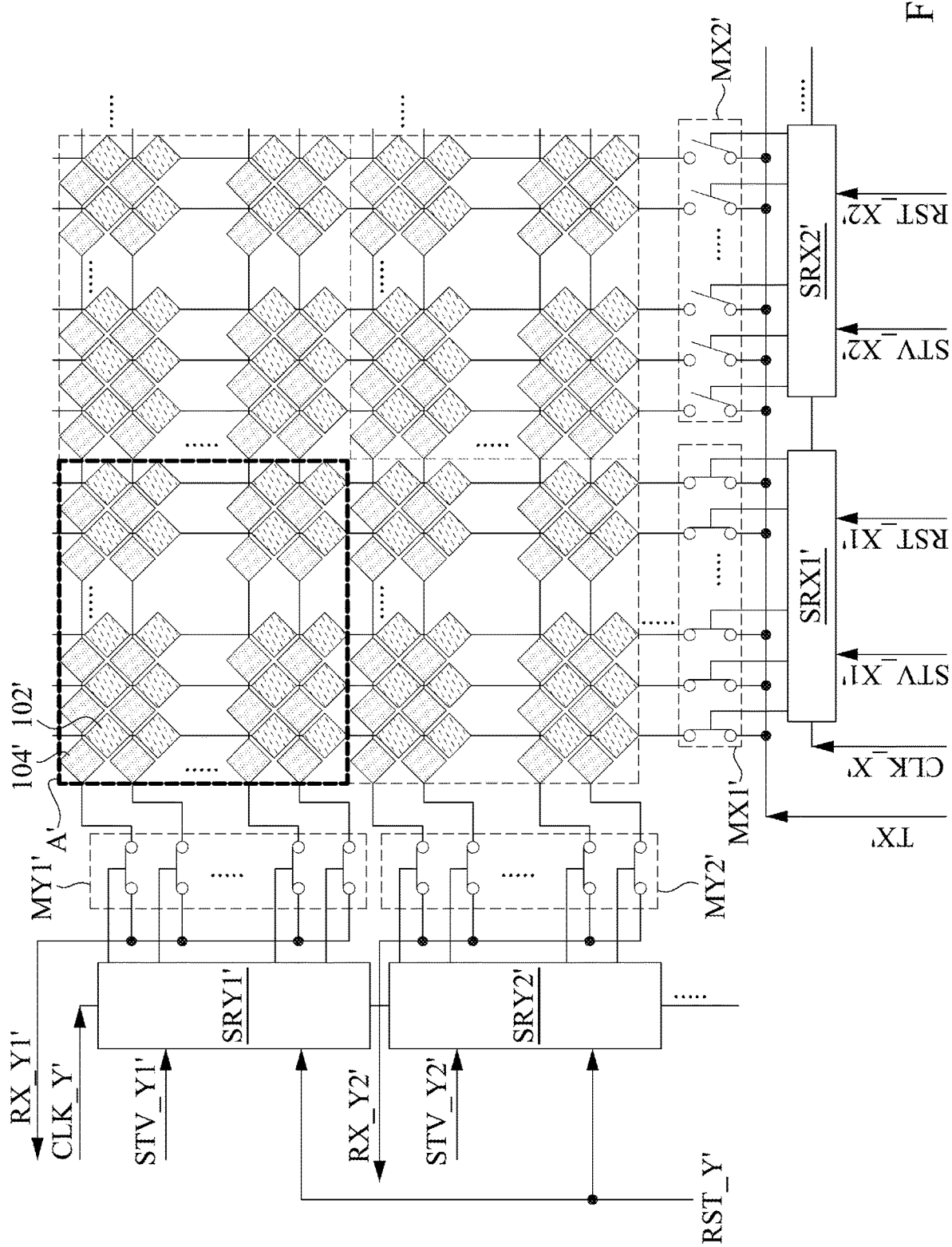
FIG. 6 is a schematic diagram illustrating a touch device with the FPR function performing a touch operation according to some embodiments of the present disclosure.

Reference is made to FIG. 6. FIG. 6 is a schematic diagram illustrating a touch device with the FPR function 600 performing a touch operation according to some embodiments of the present disclosure.

The configurations of transmitting electrodes 102', receiving electrodes 104', sensing regions A', shift register circuits SRX1'-SRX2', switch sets MX1'-MX2', switch sets MY1'-MY2', clock signals CLK_X' and CLK_Y', control signals STV_X1'-STV_X2', control signals STV_Y1'-STV_Y2', reset signals RST_X1'-RST_X2', and a transmitting signal TX' in FIG. 6 are similar to those of the transmitting electrodes 102, the receiving electrodes 104, the sensing regions A, the shift register circuits SRX1-SRX2, the switch sets MX1-MX2, the switch sets MY1-MY2, the clock signals CLK_X and CLK_Y, the control signals STV_X1-STV_X2, the control signals STV_Y1-STV_Y2, the reset signals RST_X1-RST_X2, and the transmitting signal TX in FIG. 1.

Figure 7:
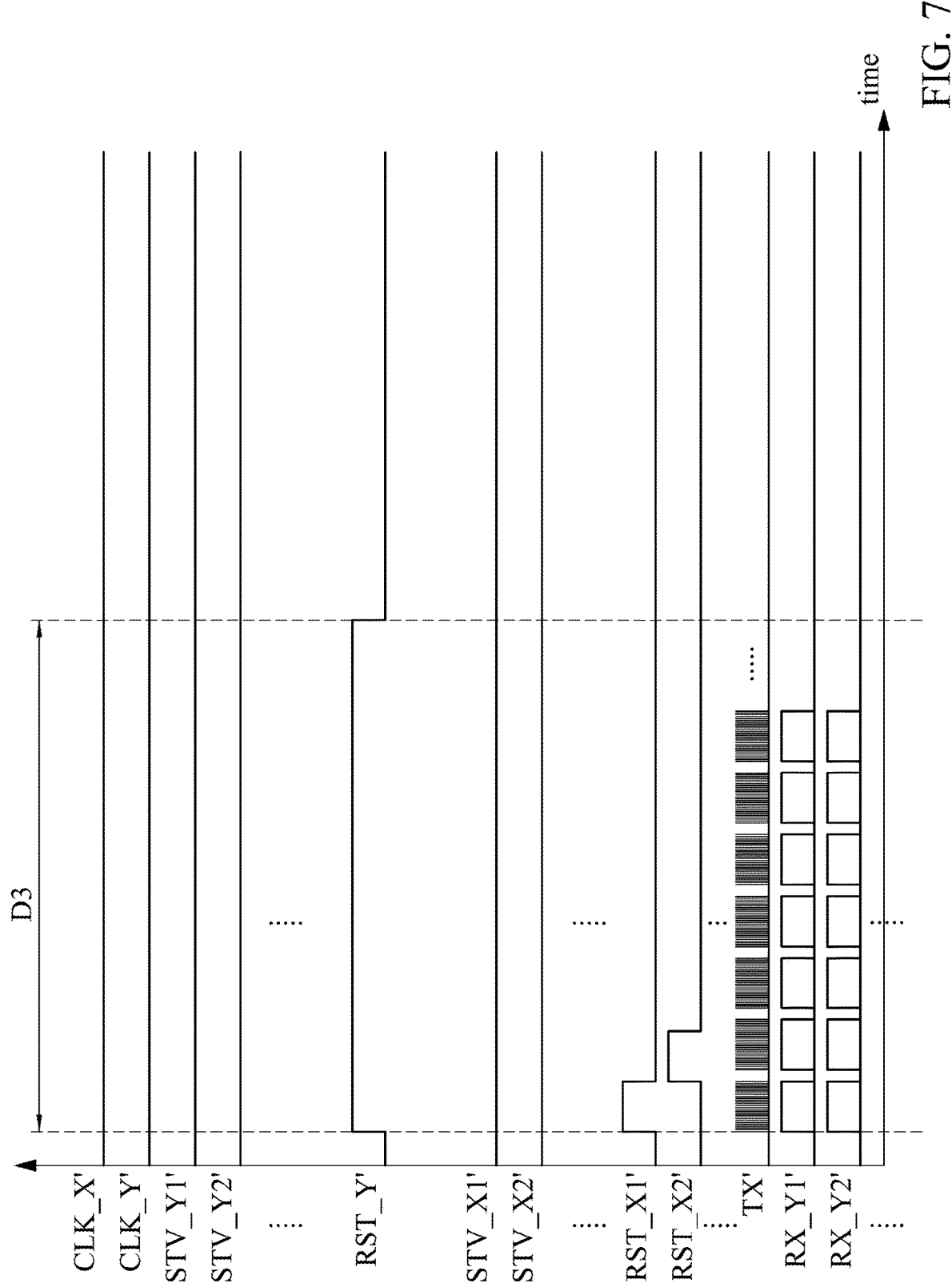
FIG. 7 is a timing sequence diagram illustrating signals in FIG. 6 according to some embodiments of the present disclosure.

References are made to FIG. 6 and FIG. 7. FIG. 7 is a timing sequence diagram illustrating signals in FIG. 6 according to some embodiments of the present disclosure.

One of major differences between FIG. 6 and FIG. 1 is that the shift register circuits SRY1'-SRY2' in FIG. 6 are controlled by the same reset signal RST_Y'.

Accordingly, as illustrated in FIG. 7, during a time interval D3, the reset signal RST_Y' has an enable level, and the shift register circuits SRY1'-SRY2' turn on switches of the switch sets MY1'-MY2' according to the reset signal RST_Y'. In addition, during the time interval D3, the reset signals RST_X1'-RST_X2' changes from a disable level to an enable level sequentially. Accordingly, the shift register circuit SRX1' turns on switches of the switch set MX1' according to the reset signals RST_X1' first, and then the shift register circuit SRX2' turns on switches of the switch set MX2' according to the reset signals RST_X2'.

When the shift register circuit SRX1' turns on the switches of the switch set MX1', the turned-on switches of the switch set MX1' transmit the touch transmitting signal TX to the transmitting electrodes 102' of the sensing regions A' in the first column. Since the switches of the switch sets MY1'-MY2' are turned on, the switches of the switch sets MY1' receive a touch receiving signal RX_Y1' from the receiving electrodes 104' of the sensing regions A' in the first row, and the switches of the switch sets MY2' receive a touch receiving signal RX_Y2' from the receiving electrodes 104' of the sensing regions A' in the second row.

Then, when the shift register circuit SRX2' turns on the switches of the switch set MX2', the turned-on switches of the switch set MX2' transmit the touch transmitting signal TX' to the transmitting electrodes 102' of the sensing regions A' in the second column. Since the switches of the switch sets MY1'-MY2' are turned on, the switches of the switch sets MY1' receive the touch receiving signal RX_Y1' from the receiving electrodes 104' of the sensing regions A' in the first row, and the switches of the switch sets MY2' receive the touch receiving signal RX_Y2' from the receiving electrodes 104' of the sensing regions A' in the second row.

Based on the similar operations, the processor circuit receives the touch receiving signals RX_Y1'-RX_Y2' of different rows. Then, the processor circuit can determine the touch position according to the touch receiving signals RX_Y1'-RX_Y2'.

Figure 8:
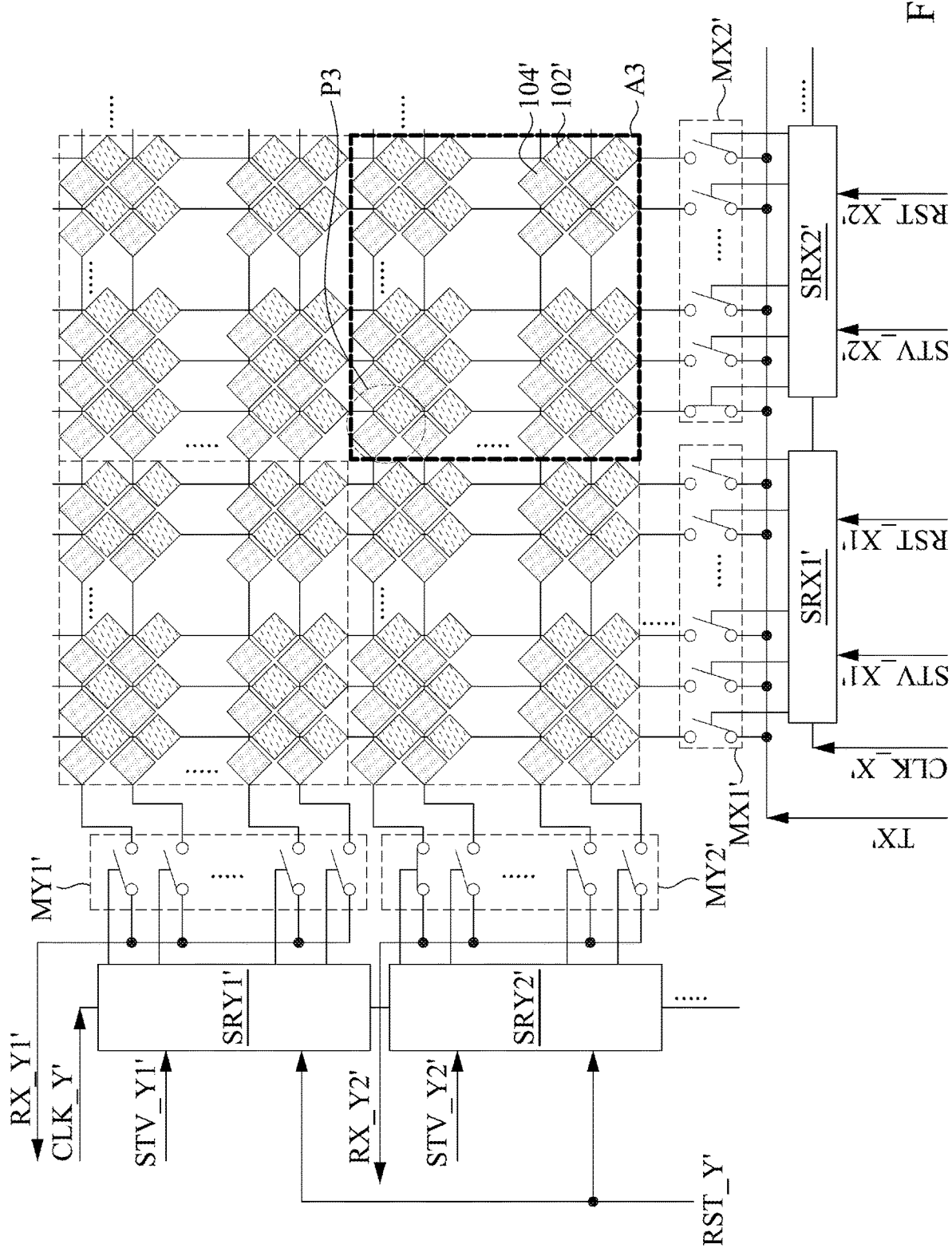
FIG. 8 is a schematic diagram illustrating the touch device with the FPR function in FIG. 6 performing a FPR operation according to some embodiments of the present disclosure.
Figure 9:
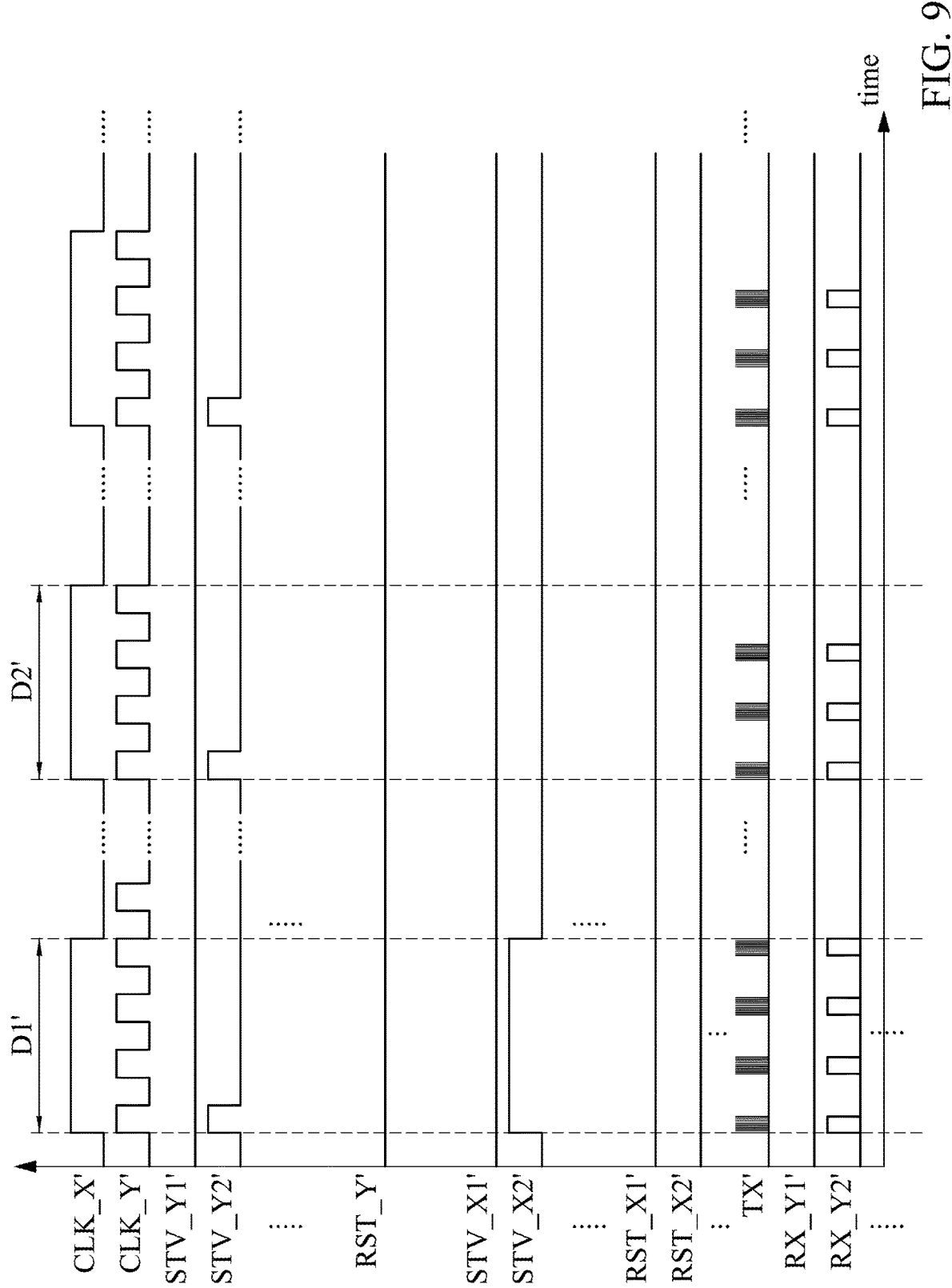
FIG. 9 is a timing sequence diagram illustrating signals in FIG. 8 according to some embodiments of the present disclosure.

References are made to FIG. 8 and FIG. 9. FIG. 8 is a schematic diagram illustrating the touch device with the FPR function 600 in FIG. 6 performing a FPR operation according to some embodiments of the present disclosure. FIG. 9 is a timing sequence diagram illustrating signals in FIG. 8 according to some embodiments of the present disclosure.

Similar to FIG. 4, if a finger touches a position P3 on the touch device with the FPR function 600, a sensing region A3 corresponding to the position P3 is determined for the subsequent FPR operation. Since a coordination of the sensing region A3 is at the second column and at the second row, the shift register circuit SRX2' and the shift register circuit SRY2' are selected according to the coordination of the sensing region A3.

As illustrated in FIG. 9, during a time interval D1', the control signal STV_X2' has an enable level and the clock signal CLK_X' has an enable level. Accordingly, the selected shift register circuit SRX2' is started up according to the control signal STV_X2' and turns on a first switch of the switch set MX2' according to the clock signal CLK_X'. The turned-on first switch of the switch set MX2 transmits the FPR transmitting signal TX' to corresponding transmitting electrodes 102'. In addition, during the time interval D1', the control signal STV_Y2' has a pulse and the clock signal CLK_Y' has multiple pulses. Accordingly, the selected shift register circuit SRY2' is started up according to the control signal STV_Y2' and turns on the switches of the switch set MY2' sequentially according to the clock signal CLK_Y'. The turned-on switches of the switch set MY2' receive the FPR receiving signals RX_Y2' from corresponding receiving electrodes 104' sequentially, and then transmit the FPR receiving signals RX_Y2' to the processor circuit.

During a time interval D2', the clock signal CLK_X' has the enable level. Accordingly, the selected shift register circuit SRX2' turns on a second switch of the switch set MX2' according to the clock signal CLK_X'. The turned-on second switch of the switch set MX2' transmits the FPR transmitting signal TX' to corresponding transmitting electrodes 102'. In addition, during the time interval D2', the clock signal CLK_Y' has multiple pulses. Accordingly, the selected shift register circuit SRY2' turns on the switches of the switch set MY2' sequentially according to the clock signal CLK_Y'. The turned-on switches of the switch set MY2' receive the FPR receiving signals RX_Y2' from corresponding receiving electrodes 104' sequentially, and then transmit the FPR receiving signals RX_Y2' to the processor circuit.

Based on the similar operations, the transmitting electrodes 102' and the receiving electrodes 104' of the sensing region A3 are sensed, and the processor circuit receives the FPR receiving signals RX_Y2' of the sensing region A3.

Then, the processor circuit can perform the FPR operation according to digital signals corresponding to the FPR receiving signals RX_Y2'.

With this configuration, the operation speed can be faster because the shift register SRY1'-SRY2' correspond to different receiving signals RX_Y1'-RX_Y2' respectively.

Figure 10:
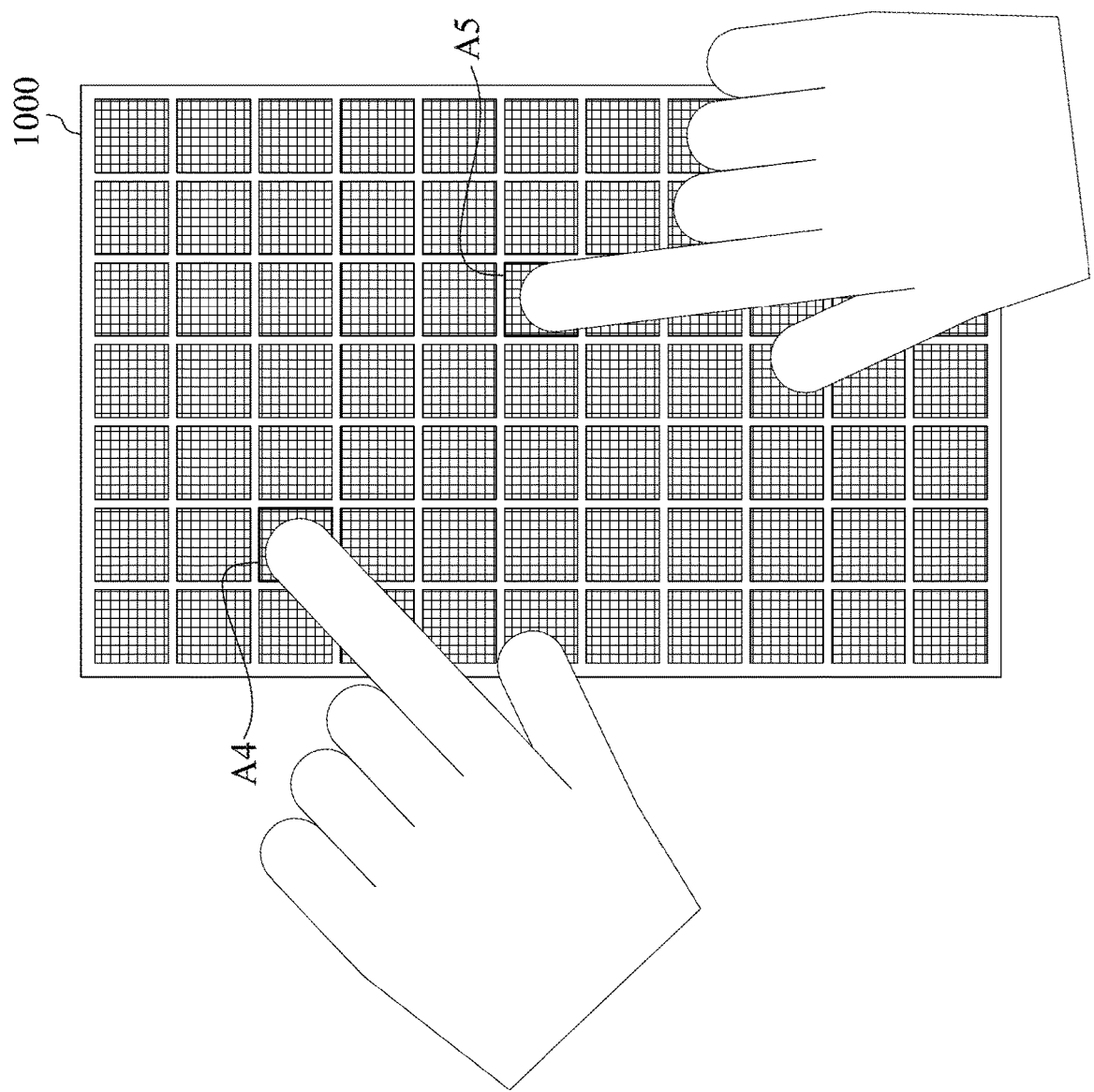
FIG. 10 is a schematic diagram illustrating a touch device with the FPR function performing a touch operation and a FPR operation simultaneously according to some embodiments of the present disclosure.

Reference is made to FIG. 10. FIG. 10 is a schematic diagram illustrating a touch device with the FPR function 1000 performing a touch operation and a FPR operation simultaneously according to some embodiments of the present disclosure.

In some embodiments, the touch operation and the FPR operation can be performed simultaneously and performed on different sensing regions of the touch device with the FPR function 1000. As illustrated in FIG. 10, one finger touches a sensing region A4 and the touch device with the FPR function 1000 performs the touch operation accordingly. The other finger touches a sensing region A5 and the touch device with the FPR function 1000 performs the FPR operation accordingly.

Figure 11:
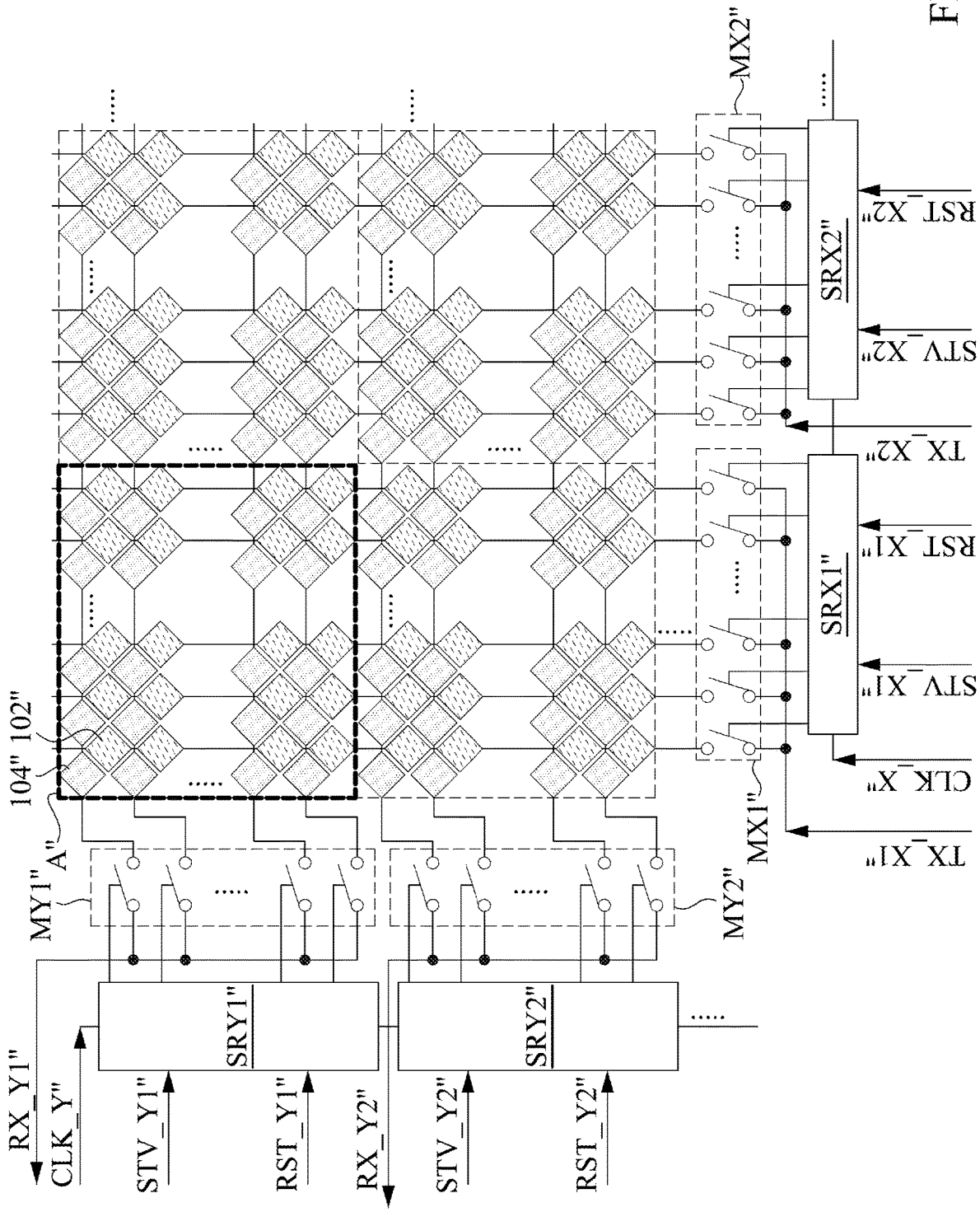
FIG. 11 is a schematic diagram illustrating a touch device with the FPR function according to some embodiments of the present disclosure.

Reference is made to FIG. 11. FIG. 11 is a schematic diagram illustrating a touch device with the FPR function 1100 according to some embodiments of the present disclosure.

The configurations of transmitting electrodes 102", receiving electrodes 104", sensing regions A", shift register circuits SRX1"-SRX2", switch sets MY1"-MY2", clock signals CLK_X" and CLK_Y", control signals STV_X1"-STV_X2", control signals STV_Y1"-STV_Y2", reset signals RST_X1"-RST_X2", and receiving signal RX_Y1"-RX_Y2" in FIG. 11 are similar to those of the transmitting electrodes 102', the receiving electrodes 104', the sensing regions A', the shift register circuits SRX1'-SRX2', the switch sets MY1'-MY2', the clock signals CLK_X' and CLK_Y', the control signals STV_X1'-STV_X2', the control signals STV_Y1'-STV_Y2', the reset signals RST_X1'-RST_X2', and receiving signal RX_Y1'-RX_Y2' in FIG. 6.

One of major differences between FIG. 11 and FIG. 6 is that the switch set MX1"-MX2" in FIG. 11 receive different transmitting signals TX_X1"-TX_X2" respectively. The other of major differences between FIG. 11 and FIG. 6 is that the shift register circuits SRY1" and SRY2" in FIG. 11 are controlled by different reset signals RST_Y1"-RST_Y2" respectively. In other words, different sensing regions A" in FIG. 11 are connected to different shift register circuits SRX1"-SRX2" and different shift register circuits SRY1"-SRY2" respectively. Thus, the sensing regions A" in FIG. 11 are controlled separately.

Figure 12:
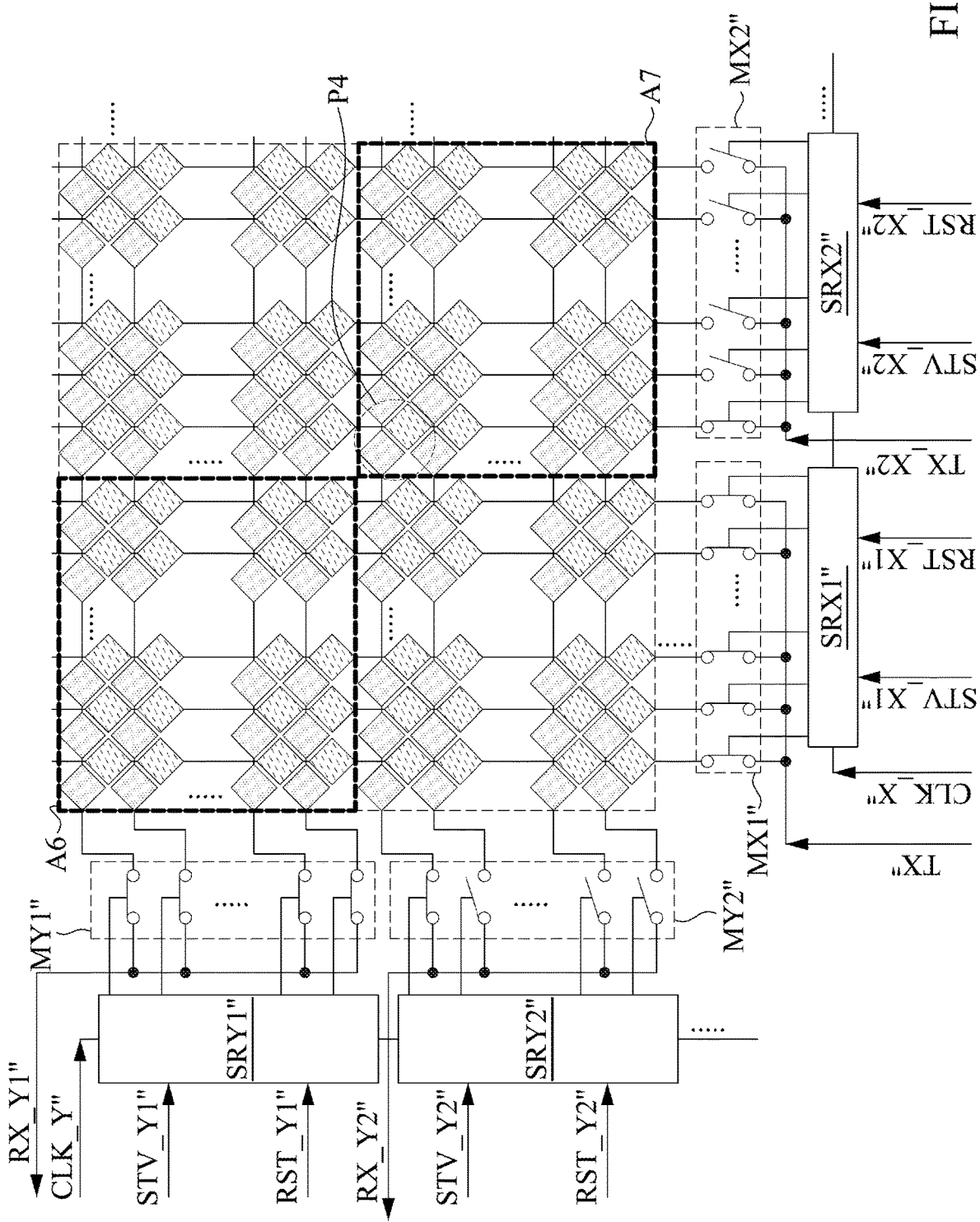
FIG. 12 is a schematic diagram illustrating the touch device with the FPR function in FIG. 11 performing a touch operation and a FPR operation simultaneously according to some embodiments of the present disclosure.

Reference is made to FIG. 12. FIG. 12 is a schematic diagram illustrating the touch device with the FPR function 1100 in FIG. 11 performing the touch operation and the FPR operation simultaneously according to some embodiments of the present disclosure.

The touch operation and the FPR operation can be performed on different sensing regions simultaneously on the touch device with the FPR function 1100. As illustrated in FIG. 12, the touch operation is performed on a sensing region A6, and the FPR operation is performed on a sensing region A7 corresponding to a touch position P4.

Regarding the touch operation, the shift register circuit SRX1" turns on switches of the switch set MX1" and the turned-on switches of the switch set MX1" transmit a touch transmitting signal TX_X1" to the transmitting electrodes 102" of the sensing regions in the first column. In addition, the shift register circuit SRY1" turns on switches of the switch set MY1" and the turned-on switches of the switch set MY1" receive a touch receiving signal RX_Y1" from the receiving electrodes 104" of the sensing regions in the first row. Thus, the touch operation can be performed for the sensing region A6 at the first column and at the first row.

Regarding the FPR operation, based on a coordination of the sensing region A7, the shift register circuit SRX2" and the shift register circuit SRY2" are selected. The shift register circuit SRX2" turns on a first switch of the switch set MX2" and the turned-on switch of the switch set MX2" transmit a FPR transmitting signal TX_X2" to the transmitting electrodes 102" of the sensing regions in the second column. In addition, the shift register circuit SRY2" turns on switches of the switch set MY2" sequentially and the turned-on switches of the switch set MY2" receive a FPR receiving signal RX_Y2" from the receiving electrodes 104" of the sensing regions in the second row. Then, similarly, the shift register circuit SRX2" turns on a second switch of the switch set MX2", and the shift register circuit SRY2" turns on switches of the switch set MY2" sequentially. Thus, the FPR operation can be performed for the sensing region A7 at the second column and at the second row.

With this configuration, the touch operation and the FPR operation can be performed on the different sensing regions A6 and A7 simultaneously on the touch device with the FPR function 1100.

It is noted that, in this example, the reset signal RST_X2" and the reset signal RST_Y2" corresponding to the FPR sensing region A7 have a disable level, and the control signal STV_X1" and the control signal STV_Y1" corresponding to the touch sensing region A6 have a disable level.

Figure 13A:
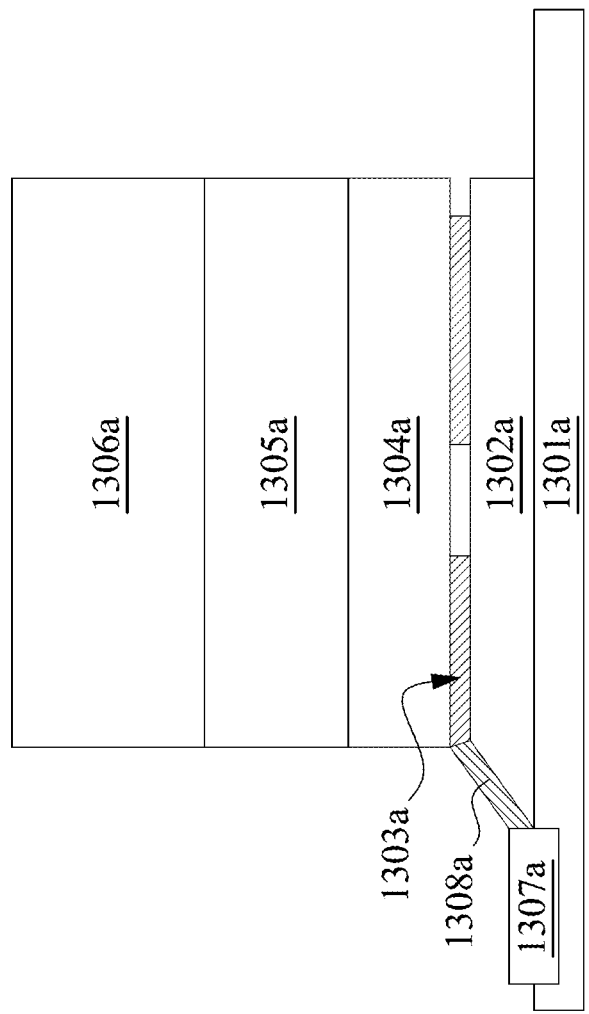
FIG. 13A is a schematic diagram illustrating an OLED on-cell stacking structure according to some embodiments of the present disclosure.

Reference is made to FIG. 13A. FIG. 13A is a schematic diagram illustrating an OLED on-cell stacking structure 1300a according to some embodiments of the present disclosure.

As illustrated in FIG. 13A, the OLED on-cell stacking structure 1300a includes a cathode layer 1301a, a thin film encapsulation (TFE) layer 1302a, a metal mesh layer 1303a, a polarizer layer 1304a, an optical clear adhesive (OCA) layer 1305a, a cover glass 1306a, a circuit area 1307a, and signal lines 1308a.

The cathode layer 1301a emits light. The TFE layer 1302a is disposed on the cathode layer 1301a. The metal mesh layer 1303a is disposed on the TFE layer 1302a and includes the transmitting electrodes 102 and the receiving electrodes 104 in FIG. 1 (or the transmitting electrodes 102' and the receiving electrodes 104' in FIG. 6, or the transmitting electrodes 102" and the receiving electrodes 104" in FIG. 11). The polarizer layer 1304a is disposed on the metal mesh layer 1303a. The OCA layer 1305a is disposed on the polarizer layer 1304a. The cover glass 1306a is disposed on the OCA layer 1305a. The circuit area 1307a is disposed on the cathode layer 1301a and includes the shift register circuits SRX1-SRX2 and SRY1-SRY2 in FIG. 1 (or the shift register circuits SRX1'-SRX2' and SRY1'-SRY2' in FIG. 6, or the shift register circuits SRX1"-SRX2" and SRY1"-SRY2" in FIG. 11). These shift register circuits in the circuit area 1307a are connected to the signal lines 1308a, and the signal lines 1308a are connected to the electrodes of the metal mesh layer 1303a by a climbing method or by other methods.

Figure 13B:
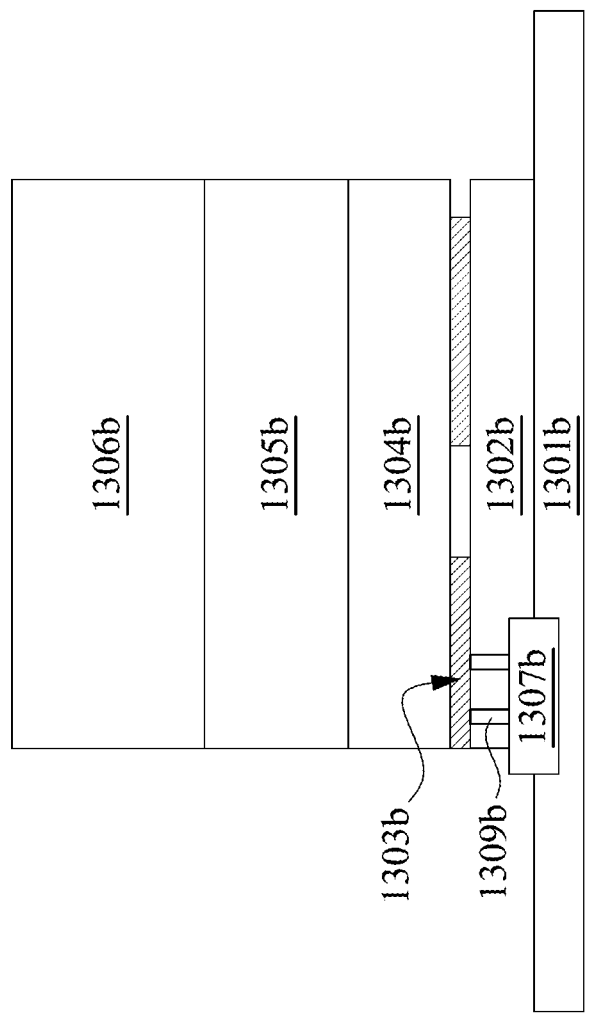
FIG. 13B is a schematic diagram illustrating an OLED on-cell stacking structure according to some embodiments of the present disclosure.

Reference is made to FIG. 13B. FIG. 13B is a schematic diagram illustrating an OLED on-cell stacking structure 1300b according to some embodiments of the present disclosure.

As illustrated in FIG. 13B, the OLED on-cell stacking structure 1300b includes a cathode layer 1301b, a TFE layer 1302b, a metal mesh layer 1303b, a polarizer layer 1304b, an OCA layer 1305b, a cover glass 1306b, a circuit area 1307b, and at least one via 1309b. The shift register circuits in the circuit area 1307b are connected to the electrodes of the metal mesh layer 1303b through the at least one via 1309b.

Figure 14:
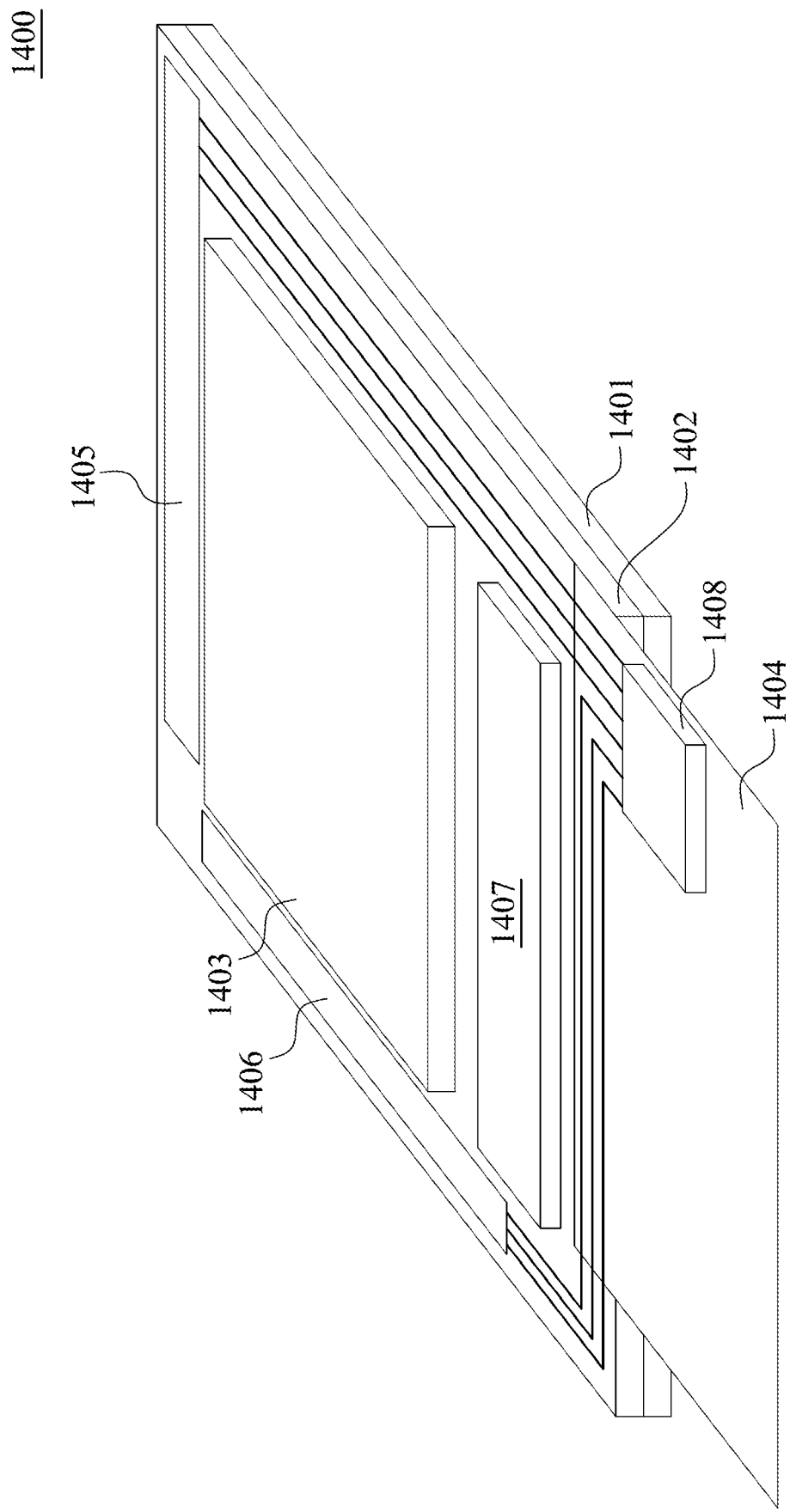
FIG. 14 is a schematic diagram illustrating a device with an on-cell stacking structure according to some embodiments of the present disclosure.
Figure 15:
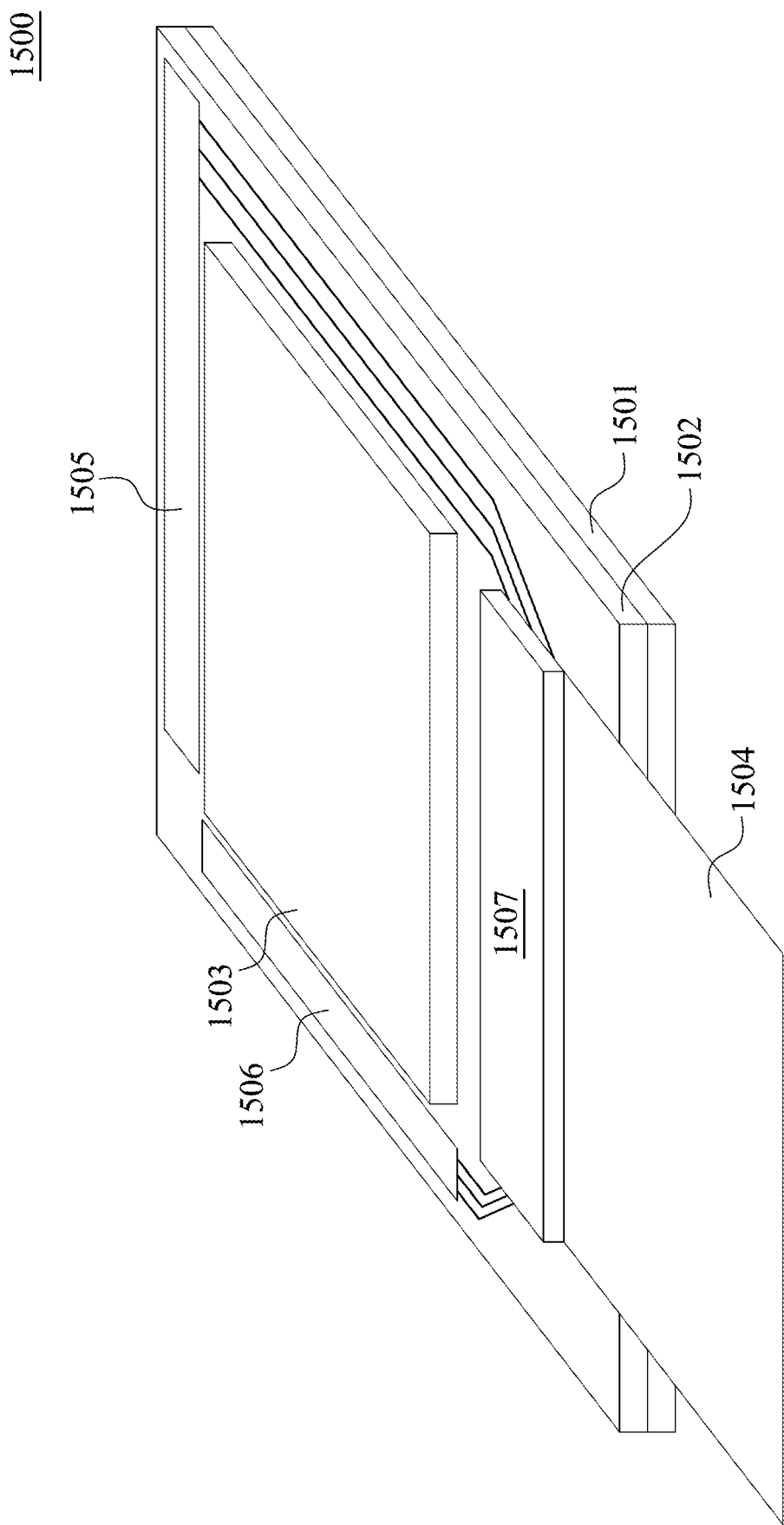
FIG. 15 is a schematic diagram illustrating a device with an on-cell stacking structure according to some embodiments of the present disclosure.

References are made to FIG. 14 and FIG. 15. FIG. 14 is a schematic diagram illustrating a device 1400 with an on-cell stacking structure according to some embodiments of the present disclosure. FIG. 15 is a schematic diagram illustrating a device 1500 with an on-cell stacking structure according to some embodiments of the present disclosure.

As illustrated in FIG. 14, a backside cupper 1401 is disposed below a substrate 1402. The substrate 1402 includes illumination elements. A metal mesh layer 1403 includes transmitting electrodes and receiving electrodes and is disposed on the substrate 1402. A flexible printed circuit (FPC) board 1404 is attached to the substrate 1402. Two circuit areas 1405 and 1406 are disposed on the substrate 1402, in which the circuit area 1405 includes the shift register circuits SRX1-SRX2 in FIG. 1 (or the shift register circuits SRX1'-SRX2' in FIG. 6, or the shift register circuits SRX1"-SRX2" in FIG. 11), and the circuit area 1406 includes the shift register circuits SRY1-SRY2 in FIG. 1 (or the shift register circuits SRY1'-SRY2' in FIG. 6, or the shift register circuits SRY1"-SRY2" in FIG. 11). The circuit areas 1405 and 1406 are connected to signal lines, and the signal lines are connected to the electrodes of the metal mesh layer 1403 by a climbing method or by other methods (e.g., the areas 1405 and 1406 are connected to the electrodes of the metal mesh layer 1403 through vias). A processor circuit 1407 is disposed on the substrate 1402, and the processor circuit 1407 can perform the display function. A processor circuit 1408 is disposed on the FPC board 1404. The processor circuit 1408 is connected to the circuit areas 1405 and 1406 through other signal lines, and the signals lines transmit the transmitting signal TX in FIG. 1 (or the transmitting signal TX' in FIG. 6, or the transmitting signals TX_X1" and TX_X2" in FIG. 11) or receive the receiving signal RX in FIG. 1 (or the receiving signal RX' in FIG. 6, or the receiving signals RX_Y1" and RX_Y2" in FIG. 11) to perform the touch function and the FPR function. Each of the processor circuits 1407 and 1408 is an integrated circuit (IC). In other words, the device 1400 includes two ICs and can perform the display function, the touch function, and the FPR function.

As illustrated in FIG. 15, a backside cupper 1501 is disposed below a substrate 1502. The substrate 1502 includes illumination elements. A metal mesh layer 1503 includes transmitting electrodes and receiving electrodes and is disposed on the substrate 1502. A FPC board 1504 is attached to the substrate 1502. Two circuit areas 1505 and 1506 are disposed on the substrate 1502, in which the circuit area 1505 includes the shift register circuits SRX1-SRX2 in FIG. 1 (or the shift register circuits SRX1'-SRX2' in FIG. 6, or the shift register circuits SRX1"-SRX2" in FIG. 11), and the circuit area 1506 includes the shift register circuits SRY1-SRY2 in FIG. 1 (or the shift register circuits SRY1'-SRY2' in FIG. 6, or the shift register circuits SRY1"-SRY2" in FIG. 11). The circuit areas 1505 and 1506 are connected to signal lines, and the signal lines are connected to the electrodes of the metal mesh layer 1503 by a climbing method or by other methods (e.g., the circuit areas 1505 and 1506 are connected to the electrodes of the metal mesh layer 1503 through vias). A processor circuit 1507 is disposed on the substrate 1502. Similar to the processor 1407 in FIG. 11, the processor circuit 1507 can perform the display function. In addition, the processor circuit 1507 is connected to the circuit areas 1505 and 1506 through signal lines, and the signals lines transmit the transmitting signal TX in FIG. 1 (or the transmitting signal TX' in FIG. 6, or the transmitting signals TX_X1" and TX_X2" in FIG. 11), or receive the receiving signal RX in FIG. 1 (or the receiving signal RX' in FIG. 6, or the receiving signals RX_Y1" and RX_Y2" in FIG. 11) to perform the touch function and the FPR function. The processor circuit 1507 is a FTDI driver IC. In other words, the device 1500 includes one IC and can perform the display function, the touch function, and the FPR function.

Figure 16:
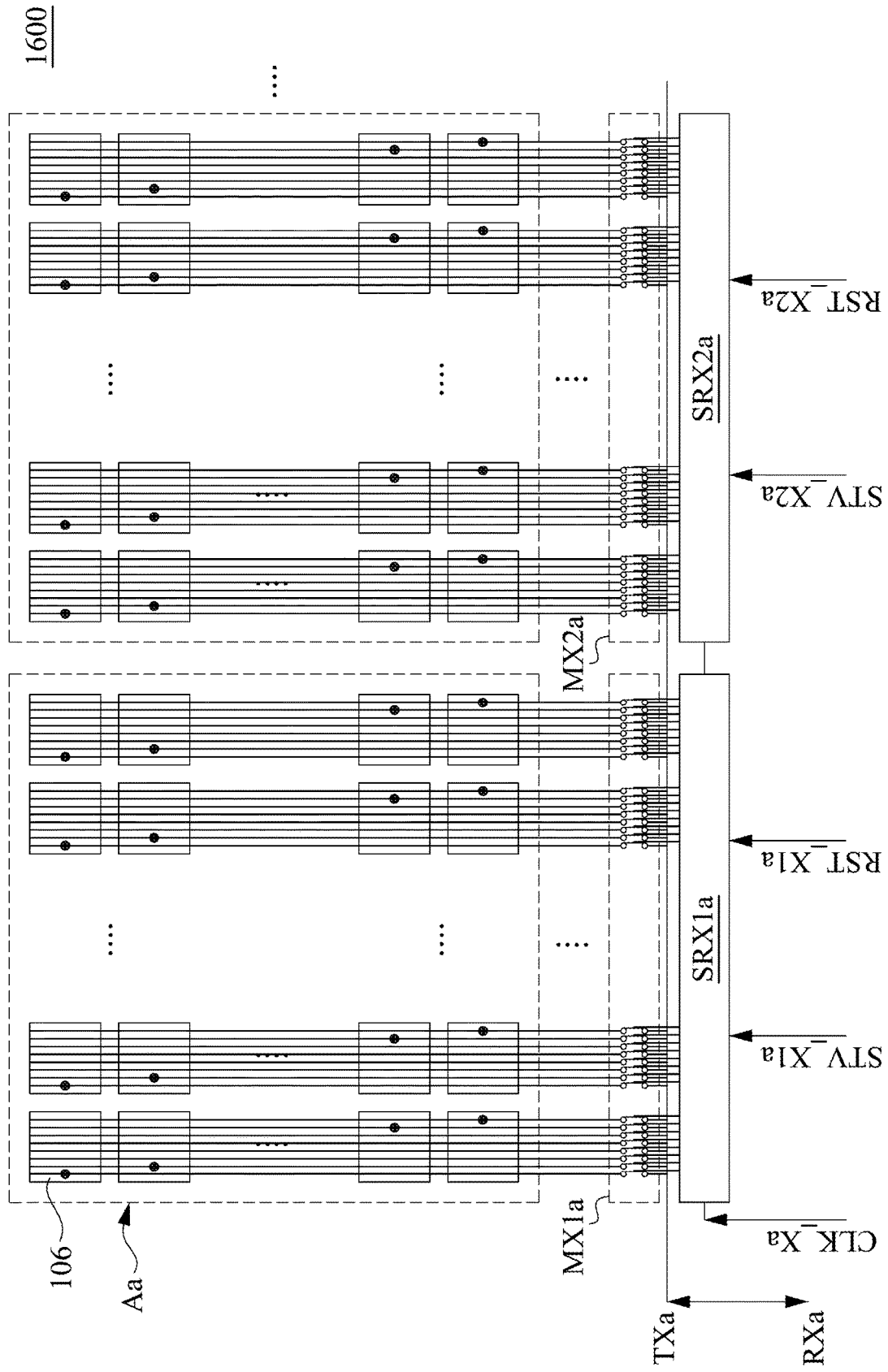
FIG. 16 is a schematic diagram illustrating a touch device with the FPR function according to some embodiments of the present disclosure.

Reference is made to FIG. 16. FIG. 16 is a schematic diagram illustrating a touch device with the FPR function 1600 according to some embodiments of the present disclosure.

As illustrated in FIG. 16, the touch device with the FPR function 1600 includes sensing regions Aa, switch sets MX1a-MX2a, and shift register circuits SRX1a-SRX2a. Each of the sensing regions Aa includes sensing electrodes 106. The switch sets MX1a-MX2a are coupled to the sensing electrodes 106. For example, each switch of the switch sets MX1a-MX2a is coupled to a corresponding sensing electrode 106. Each switch of the switch sets MX1a-MX2a transmit a transmitting signal TXa to the corresponding sensing electrodes 106 and receive a receiving signal RXa from the corresponding sensing electrodes 106. The shift register circuits SRX1a-SRX2a control switches of the switch sets MX1a-MX2a according to a clock signal CLK_Xa, reset signals RST_X1a and RST_X2a, and control signals STV_X1a-STV_X2a respectively. With the arrangements, the structure of the touch device with the FPR function 1600 forms a self-capacitance type.

Figure 17:
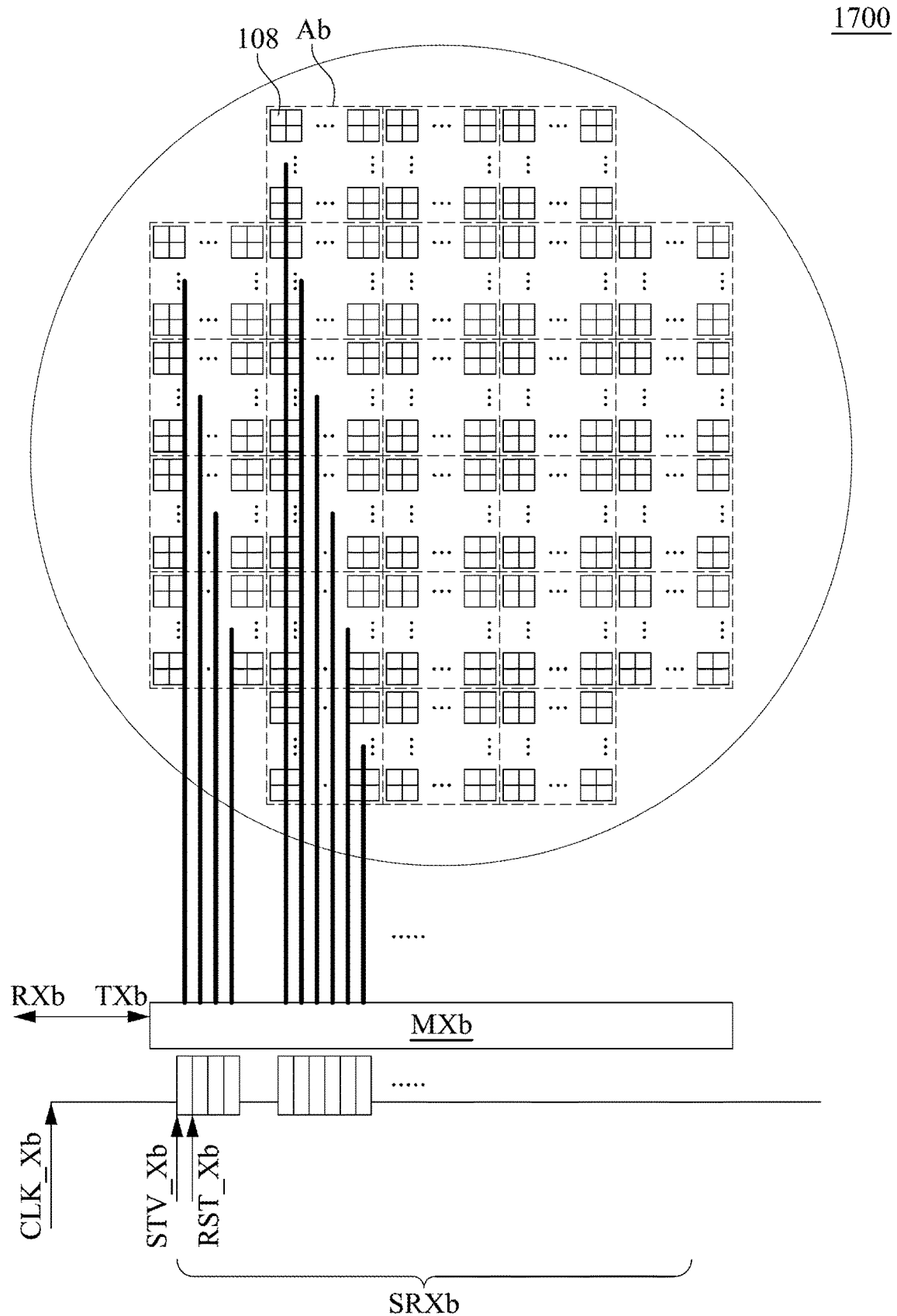
FIG. 17 is a schematic diagram illustrating a touch device with the FPR function according to some embodiments of the present disclosure.

Reference is made to FIG. 17. FIG. 17 is a schematic diagram illustrating a touch device with the FPR function 1700 according to some embodiments of the present disclosure.

The configuration of the touch device with the FPR function 1700 is similar to that of the touch device with the FPR function 1600. In some embodiments, the touch device with the FPR function 1700 is a smart watch. As illustrated in FIG. 17, the touch device with the FPR function 1700 includes sensing regions Ab, switch sets MXb, and shift register circuits SRXb. Each of the sensing regions Ab includes sensing electrodes 108. The switch sets MXb are coupled to the sensing electrodes 108. Each switch of the switch sets MXb transmit a transmitting signal TXb to the corresponding sensing electrodes 108 and receive a receiving signal RXb from the corresponding sensing electrodes 108. Each shift register circuit SRXb controls switches of a corresponding switch set MXb according to a clock signal CLK_Xb, a corresponding signal RST_Xb, and a corresponding control signal STV_Xb. With the arrangements, the structure of the touch device with the FPR function 1700 also forms a self-capacitance type.

Figure 18:
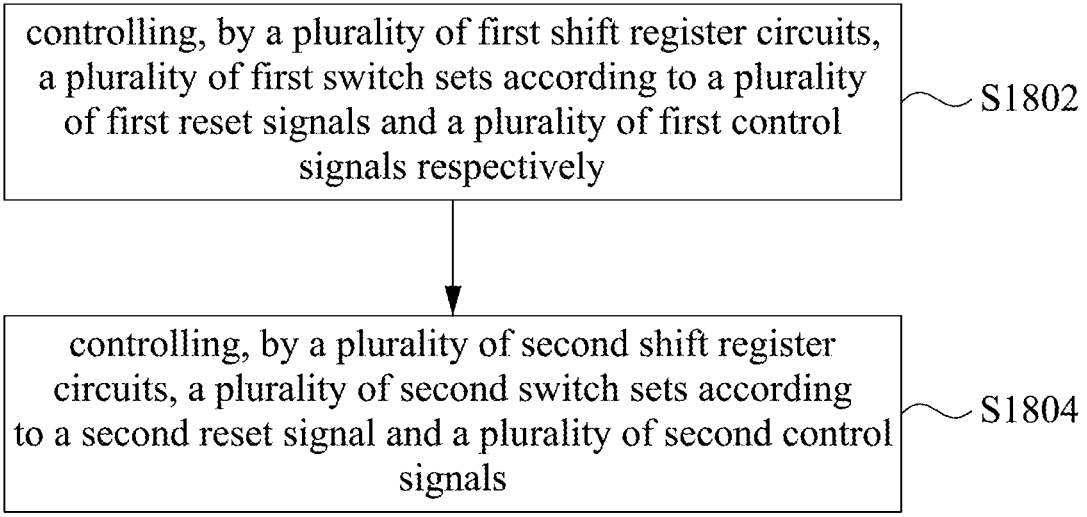
FIG. 18 is a flow diagram illustrating an operation method according to some embodiments of the present disclosure.

Reference is made to FIG. 18. FIG. 18 is a flow diagram illustrating an operation method 1800 according to some embodiments of the present disclosure.

For better understanding, the operation method 1800 is described with reference to FIG. 6, but the present disclosure is not limited thereto.

In operation S1802, the shift register circuits SRX1'-SRX2' control the switch sets MX1'-MX2' according to the reset signals RST_X1' and RST_X2' and the control signals STV_X1'-STV_X2' respectively.

In operation S1804, the shift register circuits SRY1'-SRY2' control the switch sets MY1'-MY2' according to the reset signal RST_Y' and the control signals STV_Y1'-STV_Y2.

The details of operations S1802 and S1804 are described in aforementioned embodiment associated with FIG. 6, so they are not described herein again.

Based on the descriptions above, the touch operation and the FPR operation can be implemented by the same transmitting electrodes and the same receiving electrodes of the sensing regions.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch device with a fingerprint recognition (FPR) function, comprising:
    a plurality of sensing regions comprising transmitting electrodes and receiving electrodes;
    a plurality of first switch sets coupled to the transmitting electrodes and to transmit a first signal;
    a plurality of first shift register circuits to control the first switch sets according to a first clock signal, a plurality of first reset signals and a plurality of first control signals respectively, wherein one of the plurality of first switch sets comprises a plurality of first switches, and the plurality of first switches are coupled in parallel between the transmitting electrodes and one of the plurality of first shift register circuits;
    a plurality of second switch sets coupled to the receiving electrodes and to receive a second signal; and
    a plurality of second shift register circuits to control the second switch sets according to a second clock signal, a plurality of second reset signals and a plurality of second control signals, wherein the plurality of second control signals are different from each other,
    wherein the first signal and the second signal are for a touch operation and a FPR operation,
    wherein in the touch operation, the first switch sets are controlled by the first reset signals and the second switch sets are controlled by the second reset signals, and the first clock signal and the second clock signal have disable levels, and wherein in the FPR operation, the first switch sets are controlled by the first clock signal and the second switch sets are controlled by the second clock signal, and the first reset signals and the second reset signals have disable levels.

2. The touch device with the FPR function of claim 1, wherein one of the first shift register circuits turns on the first switches of the one of the first switch sets according to one of the first reset signals for the touch operation.

3. The touch device with the FPR function of claim 2, wherein one of the second shift register circuits turns on switches of one of the second switch sets according to one of the second reset signals for the touch operation.

4. The touch device with the FPR function of claim 1, wherein one of the sensing regions is determined when the touch operation is performed on a position and the position is in the one of the sensing regions, wherein the one of the first shift register circuits and the one of the second shift register circuits is selected according to the one of the sensing regions.

5. The touch device with the FPR function of claim 4, wherein the selected first shift register circuit turns on the first switches of the one of the first switch sets sequentially according to one of the first control signals and the first clock signal for the FPR operation.

6. The touch device with the FPR function of claim 5, wherein the selected second shift register circuit turns on switches of one of the second switch sets sequentially according to one of the second control signals and the second clock signal for the FPR operation when the selected first shift register circuit turns on one of the first switches of the one of the first switch sets.

7. The touch device with the FPR function of claim 1, wherein the touch operation and the FPR operation are performed simultaneously.

8. The touch device with the FPR function of claim 1, wherein the first shift register circuits and the second shift register circuits are connected to a plurality of signal lines, and the signal lines are connected to the transmitting electrodes and the receiving electrodes by a climbing method.

9. The touch device with the FPR function of claim 1, wherein the first shift register circuits and the second shift register circuits are connected to the transmitting electrodes and the receiving electrodes through a via.

10. The touch device with the FPR function of claim 1, wherein a structure of the touch device with the FPR function is a mutual-capacitance type.

11. The touch device with the FPR function of claim 1, wherein a structure of the touch device with the FPR function is a self-capacitance type.

12. An operation method of a touch device with the FPR function, wherein the operation method comprises:
controlling, by a plurality of first shift register circuits, a plurality of first switch sets according to a first clock signal, a plurality of first reset signals and a plurality of first control signals respectively, wherein the first switch sets are coupled to a plurality of transmitting electrodes to transmit a first signal, wherein one of the plurality of first switch sets comprises a plurality of first switches, and the plurality of first switches are coupled in parallel between the transmitting electrodes and one of the plurality of first shift register circuits; and
controlling, by a plurality of second shift register circuits, a plurality of second switch sets according to a second clock signal, a plurality of second reset signals and a plurality of second control signals, wherein the second switch sets are coupled to a plurality of receiving electrodes to receive a second signal, wherein the plurality of second shift register circuits are controlled by the plurality of second control signals which are different from each other,
wherein the first signal and the second signal are for a touch operation and a FPR operation,
wherein in the touch operation, the first switch sets are controlled by the first reset signals and the second switch sets are controlled by the second reset signals, and the first clock signal and the second clock signal have disable levels, and
wherein in the FPR operation, the first switch sets are controlled by the first clock signal and the second switch sets are controlled by the second clock signal, and the first reset signals and the second reset signals have disable levels.

* * * * *